United States Patent

Anderson et al.

Patent Number: 5,817,740
Date of Patent: Oct. 6, 1998

[54] LOW PILL POLYESTER

[75] Inventors: Harvey Gene Anderson, Kinston; Arun Pal Aneja, Greenville; Robert Lee Edmundson, Elm City; Adrian Charles Snyder, Greenville, all of N.C.

[73] Assignee: E. I. du Pont de Nemours and Company, Wilmington, Del.

[21] Appl. No.: 992,045

[22] Filed: Dec. 17, 1997

Related U.S. Application Data

[63] Continuation-in-part of Ser. No. 799,514, Feb. 12, 1997, abandoned.

[51] Int. Cl.[6] .............................. C08G 63/68; D02G 3/00
[52] U.S. Cl. ...................... 528/295; 528/275; 528/279; 528/302; 528/308; 528/308.6; 524/730; 428/359; 428/364
[58] Field of Search ...................... 528/275, 279, 528/295, 302, 308, 308.6; 524/730; 428/359, 364

[56] References Cited

U.S. PATENT DOCUMENTS

| | | | |
|---|---|---|---|
| H1275 | 1/1994 | Duncan | 428/357 |
| 2,071,251 | 2/1937 | Carothers | 18/54 |
| 2,465,319 | 3/1949 | Whinfield et al. | 260/75 |
| 3,018,272 | 1/1962 | Griffing et al. | 260/75 |
| 3,104,450 | 9/1963 | Christens et al. | 57/140 |
| 3,335,211 | 8/1967 | Mead et al. | 264/176 |
| 3,576,773 | 4/1971 | Vaginay | 260/22 |
| 3,914,488 | 10/1975 | Gorrafa | 428/397 |
| 4,110,316 | 8/1978 | Edging et al. | 526/68 |
| 4,113,704 | 9/1978 | MacLean et al. | 528/289 |
| 4,146,729 | 3/1979 | Goodley et al. | 560/94 |
| 4,634,625 | 1/1987 | Franklin | 428/258 |
| 4,707,407 | 11/1987 | Clark et al. | 428/361 |
| 4,945,151 | 7/1990 | Goodley et al. | 528/272 |
| 5,219,582 | 6/1993 | Anderson et al. | 425/72.2 |
| 5,300,626 | 4/1994 | Jehl et al. | 528/274 |
| 5,478,909 | 12/1995 | Jehl et al. | 528/274 |
| 5,559,205 | 9/1996 | Hansen et al. | 528/279 |
| 5,591,523 | 1/1997 | Aneja | 428/357 |
| 5,607,765 | 3/1997 | Hansen et al. | 428/364 |
| 5,626,961 | 5/1997 | Aneja | 428/397 |
| 5,736,243 | 4/1998 | Aneja | 428/357 |

OTHER PUBLICATIONS

Ludewig, "Polyester Fibres, Chemistry & Technology", 1971, pp. 105, (iii) and (iv).
ASTM D3512–82.

*Primary Examiner*—Samuel A. Acquah

[57] ABSTRACT

New polyester composition for new polyester staple fiber that provides fabrics having a combination of excellent pilling performance, aesthetics and tactility ("hand"). Preferred fibers have non-round cross-sections that are retained, especially such non-round cross-sections having multi-grooved scalloped-oval cross-sections that provide fabrics having outstanding comfort qualities of moisture-management, dryness and comfort, along with minimal pilling.

4 Claims, 2 Drawing Sheets

LOW PILL POLYESTER

CROSS-REFERENCE TO RELATED APPLICATION

This application is a continuation-in-part of our copending application Ser. No. 08/799,514, filed Feb. 12, 1997, and to be abandoned in favor of the present application.

FIELD OF THE INVENTION

This invention concerns low pill polyester, as described hereinafter, and is more particularly concerned with a new copolyester composition that provides staple fiber that is capable of forming yarns, fabrics and garments that have a combination of excellent pilling performance, aesthetics and tactility ("hand"), especially such staple fiber of non-round cross-sections as multi-grooved scalloped-oval cross-sections that retain such cross-section so their fabrics have outstanding qualities of moisture-management, dryness and comfort as well as exhibiting minimal pills, and downstream products thereof, intermediates therefor and processes for obtaining or processing any of these.

BACKGROUND OF INVENTION

Polyesters have been produced commercially on a large scale for processing into shaped articles such as fibers, films and bottles, primarily from poly(ethylene terephthalate). Synthetic polyester yarns, for example, have been known and used commercially for several decades, having been first suggested by W. H. Carothers, U.S. Pat. No. 2,071,251, and then Whinfield and Dickson suggested poly(ethylene terephthalate) in U.S. Pat. No. 2,465,319. Poly(ethylene terephthalate), sometimes referred to as PET, has been the polyester polymer used most frequently for commercial purposes and has been made from ethylene glycol and from dimethyl terephthalate or terephthalic acid; these polymer precursors have been conveniently reacted together commercially by ester interchange or by direct esterification, respectively, followed by condensation polymerization, generally in multiple stages, with appropriate provision to remove condensation products, such as water, and also excess ethylene glycol that is preferably recycled with removal of unwanted water and by-products, as appropriate, as described in the art, e.g., Edging and Lee, U.S. Pat. No. 4,110,316, MacLean and Estes, U.S. Pat. No. 4,113,704, Goodley and Shiffler, U.S. Pat. No. 4,146,729, and Goodley and Taylor, U.S. Pat. No. 4,945,151.

Polyester fibers are either (1) continuous filaments or (2) fibers that are discontinuous, which latter are often referred to as staple fiber or cut fibers. Polyester staple fiber is made by first being formed by extrusion into continuous polyester filaments, which are processed in the form of a tow of continuous polyester filaments before being converted into staple.

"Pilling" is a problem that has always existed in fabrics and garments of synthetic polyester staple fiber. It had been a problem for a long time already in the early 1960's, as disclosed in U.S. Pat. Nos. 3,104,450 and 3,335,211, to which we shall revert hereinafter. Other complaints about such fabrics and garments have included complaints about fabric handle (stiffness and poor drapeability), about the need for special dyeing conditions at temperatures above 100° C., requiring superatmospheric pressure, and about "comfort" properties. Prior improvements to address these complaints will be discussed hereinafter.

Mostly, the objective of synthetic fiber producers has been to replicate advantageous properties of natural fibers, the most common of which have been cotton and wool fibers.

Most of the polyester cut fiber has been of round cross-section and has been blended with cotton. A typical spun textile yarn is of cotton count 25, and of cross section containing about 140 fibers of 1.5 dpf (denier per filament) and 1.5 inch length. It has been the custom to match dpf and length. 1.5 dpf and 1.5 inch length corresponds to 1.7 dtex and almost 4 cm. Denier is the weight in grams of 9000 meters of fiber and thus a measure in effect of the thickness of the fiber. When one refers to denier, the nominal or average denier is often intended, since there is inevitably variation along-end and end-to-end, i.e., along a filament length and between different filaments, respectively. In general, it has been the objective of fiber producers to achieve as much uniformity as possible in all processing steps along-end and end-to-end so as to produce a polyester fiber of round cross section. Fibers of round cross-section are less costly to make and dye.

A significant improvement in "comfort" attributes of polyester continuous filaments and staple fibers has been achieved by DuPont by using a specific non-round cross-section instead of a round cross-section. This specific cross-section is termed a multi-grooved scalloped-oval cross-section. This cross-section provides improved fabric hand, over a round cross-section, and the multiple grooves enable moisture to be wicked along the fibers which provides dryness and improves comfort of the wearer. This is referred to as moisture-management. Twenty years ago, a polyester filament of scalloped-oval cross-section was disclosed by Gorrafa in U.S. Pat. No. 3,914,488, the disclosure of which is hereby expressly incorporated herein by reference, as are the disclosures of Franklin U.S. Pat. No. 4,634,625 and Clark et al. U.S. Pat. No. 4,707,407 which disclose filaments of similar scalloped-oval cross-section for use in continuous filament yarns and staple. Also Aneja has filed copending applications Ser. Nos. 08/662,804 (DP-6400) on Jun. 12, 1996, corresponding to WO 97/02374, 08/497,495 (DP-6255) on Jun. 30, 1995, now issued as U.S. Pat. No. 5,591,523, corresponding to WO 97/02372, and 08/642,650 (DP-6365-A) on May 3, 1996, now issued as U.S. Pat. No. 5,626,961, corresponding to WO 97/02373, the disclosures of which are also incorporated herein by reference, Roop has disclosed an 8-grooved scalloped-oval cross-section in application Ser. No. 08/778,462 (DP-6550), filed Jan. 3, 1997 and preferred spinnerets for making filaments of multi-grooved scalloped-oval cross-section have been disclosed by Aneja and Roop in application Ser. No. 08/778, 458 (DP-6555), also filed Jan. 3, 1997, and these disclosures are also incorporated herein by reference. As indicated, a multi-grooved scalloped-oval cross-section has provided significant improvements in polyester fabrics. However, pilling has remained a serious problem heretofore, despite many attempts to solve it.

In the early 1960's, Christens et al disclosed in U.S. Pat. No. 3,104,450 that many attempts had been made to solve the pilling problem in fabrics of polyester spun yarns (made with polyester staple fiber). Their solution was to control the relative viscosity of the polymer and the tensile properties of the fiber within very narrow limits (col 1, lines 65 et seq). Their critical limits for the relative viscosity (measured as described in col 2, lines 57–62) of polyethylene terephthalate homopolymer were from 13.5 to 16.5, preferably 14.5 to 15.5. For copolyesters, the viscosity limits had to be increased by 0.5 unit for each mol % of added copolymer content. They referred to an RTPT test for pilling (discussed hereinafter) as then being still in the balloting process by the ASTM; they gave no pill ratings under that test. Despite the improvements achieved by this suggestion, pilling has remained a problem as evidenced by the continuing disclosures of researchers to solve the pilling problem presented by commercially-available polyester fibers to this date.

A contemporaneous solution for overcoming the pilling problem was disclosed by Mead et al in U.S. Pat. No. 3,335,211, namely preparing fibers of relative viscosity 10 to 17 (measured as described in col 8, lines 56–61) by melt-spinning anhydrous polyester modified with an oxysilicon compound such as tetraethyl orthosilicate, so as to have a melt viscosity at 275° C. of about 1000 to 6000 poises.

Originally, polyester yarns were made by batch operations, involving several separate processes, first making the polyester polymer, and then melt-spinning the polymer into filaments, and further processing the filaments into continuous filament yarns or staple fiber, as described, e.g., by Ludewig in "Polyester Fibres, Chemistry and Technology", first published in German in 1964, and then in an English translation by John Wiley & Sons Ltd., 1971. However, as indicated in the literature, there has always been a desire to economize, and so to couple various separate stages together. Some fiber manufacturers have operated a wholly continuous process, starting with the polymer precursors that are reacted together and then polymerized to form a polyester polymer melt that is extruded into solid filaments that are processed into continuous (multi-filament) yarns as a wholly continuous process, or into staple fiber (usually as a separate process). However, many manufacturers, in various countries, have not changed to a continuous process, because of the problems presented by continuous operations.

As indicated, although many polyester polymers (including copolymers) have been suggested, the polyester most widely manufactured and used hitherto for textile fibers has been poly(ethylene terephthalate), which is often referred to as homopolymer PET. Homopolymer PET has generally been preferred over copolymers because of its lower cost, and also because its properties have been entirely adequate, or even preferred, for most end-uses. It is known, however, that homopolymer PET requires special dyeing conditions (high temperature requiring super-atmospheric pressure) not required for nylon fibers, for example. Homopolymer PET is often referred to as 2G-T, and 2G-T is the polyester polymer that has so far been used the most.

Poly(ethylene terephthalate/5-sodium-sulfoisophthalate) copolyester has, however, also been manufactured and used commercially in considerable quantities for some thirty years, especially for staple. This copolyester was first suggested by Griffing and Remington in U.S. Pat. No. 3,018,272. A very desirable feature of this copolyester is its affinity for basic (cationic) dyes. Commercially, such copolyester has generally contained about 2 mole % of the ethylene 5-sodium-sulfo-isophthalate repeat units. Such basic-dyeable copolyester has sometimes been referred to as 2G-T/SSI. As indicated hereinabove, the teaching of Christens et al in U.S. Pat. No. 3,104,450 was that the viscosity limits to solve the pilling problem in fibers of copolyester copolymers had to be increased by 0.5 unit for each mol % of "added copolymer content". In other words, use of 2 mol % of "added copolymer content" as in 2G-T/SSI would mean using copolymer of relative viscosity 14.5 to 17.5, preferably 15.5 to 16.5, as measured in that patent.

It has long been highly desirable to make improvements in providing basic-dyeable copolyesters, especially for spinning into filaments for use as textile fibers, so Hansen et al have recently disclosed such improvements in U.S. Pat. Nos. 5,559,205 (DP-6335) and 5,607,765 (DP-6335-B) relating to basic-dyeable ethylene terephthalate copolyester containing 0.5 to 5 mole % of a metal sulfonate salt of a glycollate of isophthalic acid, especially such lithium salt, and the disclosures of both these are hereby specifically included herein by reference.

As indicated in the literature, such as Chapter 4 of Ludewig, especially page 105, titanium dioxide ($TiO_2$) is a preferred delustering agent used for polyester fiber. Amounts of 1–2% by weight have been used to make what is often referred to as "dull" fiber. Amounts of 0.2–0.5% by weight of titanium dioxide have been used to make what is often referred to as "semi-dull" fiber. Some "clear polymer" with essentially no delustering agent is also used to make polyester fibers. This is referred to, for instance, by Oxford et al in WO 92/13120.

Oxford et al (DuPont) WO 92/13120) disclosed that polyester filaments of 0.5 to 3 denier per filament having scalloped-oval cross-section, formed of "clear" ethylene terephthalate polymer of specified viscosity modified by inclusion of polyethylene oxide, provided fabrics having pleasing luster, greater drapeability, reduced pilling, and low temperature carrier-free dyeing when compared to existing round cross-section 100% polyester and polyester-rich blended (cotton/wool/rayon/silk) polyester fabrics. Oxford's objective was to provide polyester fibers having characteristics of new rayon fibers but retaining important advantages of conventional polyester fibers (page 2, lines 1–4). Oxford solved this problem by providing a novel combination of selected "clear" (i.e., without delusterant) modified polymer with selected filament cross-section, the polymer modifier being polyethylene oxide (PEO) and the LRV viscosities being in the range about 19 to 21 for clear homopolymer and in the range about 15.5 to 17.5 for clear 2G-T/SSI (page 3, lines 4–14 and claims 1 and 2). Oxford taught that his novel combination of scalloped-oval cross-section with selected clear (un-delustered) polymers (preferably with enhanced dyeability) achieved a subtle fabric luster similar to that of "natural fiber" without loss of the desirable characteristics that had made polyester fiber attractive to the industry, and that he was surprised. Oxford was also surprised by the pilling performance, in view of the viscosities of the polymers, because the art had taught that low viscosity polymer had been desired to improve pilling performance (page 3, lines 15–24). Oxford taught that a viscosity builder, such as a trifunctional or tetrafunctional monomer, such as tetraethyl silicate (TES), or as used in his Examples (which taught trimethylol propane), could be incorporated in the polymer composition in effective amount to enhance spinning performance, and that use of such monomers, as chain-branchers, had been taught previously, e.g., by MacLean et al in U.S. Pat. No. 4,092,299 and by Mead et al in U.S. Pat. No. 3,335,211, but that many such had contained delusterant, usually titanium dioxide (page 5, lines 2–13). Oxford's Examples made staple fiber from commercial clear PET polymer with essentially no titanium dioxide but containing 3.9% by weight of PEO and 0.175% by weight of trimethylol propane of 20.5 LRV and listed following RTPT pill ratings for fabrics of his fibers: in Example 1, 4.2 and 2.6 for item 1.3 after 10 and 60 minutes, respectively, for a woven twill fabric; in Example 3, after 15 and 120 minutes, respectively, 4.5 and 4.4 for item 3.1, 3.8 and 1.6 for item 3.4, and again for item 1.3, 4.5 and 2.6, all for woven twill fabrics; in Example 5, again for item 1.3, but this time for a fabric knit from a yarn blended 50/50 cotton/item 1.3 polyester, after 15 minutes, 30 minutes and 60 minutes, 4.5, 3.3 and 1.5, respectively, to show a clear advantage over T-107W (round 11.5 LRV homopolymer) chosen because sold commercially as a "pill resistant" product for knit end uses, T-107W's pill ratings being 3.3, 1.8 and 1.2, respectively. The specific pill ratings measured by Oxford demonstrate several points of significance that are understood by those in this field: (1) the pilling performance of polyester fibers sold commercially has not been good; (2) pill ratings for knit fabrics are very much lower than pill ratings for woven fabrics made from the same polyester staple fiber; (3 may not be apparent from the disclosure of Oxford, but is well understood by those skilled in this field) the presence of cotton in a blended spun yarn improves the pill rating of like fabrics made from the same polyester fiber, i.e., a fabric knit from a 50/50 cotton blend spun yarn has a significantly higher pill rating than a fabric knit identically from the same polyester fiber in a 100% polyester spun yarn; (4) despite all this, a polyester fiber sold commercially in the 1990's as a "pill resistant" product for knit end-uses had an RTPT pill rating of only 1.2 after 60 minutes when knit as a 50/50 cotton blend; (5) Oxford's best product (that gave good pill ratings in woven twill fabrics) gave a pill rating of only 1.5 after 60 minutes when knit as a 50/50 cotton blend; (6) Oxford considered this improvement to a pill rating of 1.5 for a fabric knit from a 50/50 cotton blend over a pill rating of 1.2 for a like fabric knit from like yarn in which the polyester fiber was a commercially-available "pill resistant" product was a significant advance. The above discussion has been given at length, so that the reader can understand the magnitude of this problem facing those skilled in this field who have previously attempted to solve this problem.

Duncan, U.S. SIR H1275, disclosed polyester filaments of 0.5–2 denier per filament from ethylene terephthalate polymers modified both by polyethylene oxide and by tetraethyl silicate to give polymers of commercial spinning viscosities, and textile fibers and fabrics having greatly improved dye rates, good color stability to standard lightfastness and wash cycles and good pilling, when compared to unmodified polyester and polyester/cotton blend fabrics. As indicated, Duncan's objective was to provide significantly enhanced dye rates (an RDR of at least 150) without losing good pilling characteristics. Duncan measured Flex Life and RTPT pill ratings and found fabrics of his fibers demonstrated pill performance comparable to the current commercially available pill resistant fibers T-107 and T-40A (column 5, lines 33–42) for fabrics knit from 50/50 blends with cotton. Duncan's best pill ratings were 2.0 and 1.7, compared to 2.0 for T-107 and 1.5 for T-40A (Table in col 7).

Both Duncan and Oxford refer to prior disclosures of using chain-branchers, such as Mead et al and MacLean et al, referred to above, and also Vaginay in U.S. Pat. No. 3,576,773.

As can be seen from art published in the 1990's, such as Oxford and Duncan, referred to above, and such as Jehl et al in U.S. Pat. Nos. 5,300,626 and 5,478,909, discussed hereinafter, the problem of pilling still exists, and pill ratings (according to ASTM D3512 82) of only 2.0 after 60 minutes have been the best disclosed for fabrics knitted from 50/50 cotton/polyester blend spun yarns, so the pilling performance of 100% polyester knit fabrics would have been even worse. As discussed hereinafter, Jehl apparently used a different test; Jehl's process approach may not be economical or easy to achieve in commercial practice.

The object of the present invention was to solve this long-standing problem which has resisted the sustained efforts by those skilled in the art for so many decades.

SUMMARY OF INVENTION

According to one aspect of the invention, there is provided a new basic-dyeable ethylene terephthalate copolyester polymer that contains 0.5 to 3 mol % of a sodium sulfonate salt of a glycollate of isophthalic acid, and that has been polymerized in the presence of a trifunctional or tetrafunctional silicate ortho ester in amount 0.05 to 0.5% by weight, and that contains titanium dioxide in amount 0.1 to 2% by weight, said copolyester being of relative viscosity about 8 to 12 LRV and about 1 to 3 delta RV ($\Delta$RV), as defined hereinafter.

Preferably, the LRV of such copolyester is about 9 to 11.

We have found, according to the invention, that new copolyester polymer compositions of LRV about 9 to 11 and of delta RV about 1 to 3 can be formed into staple fiber that can provide knit fabrics of 100% polyester of excellent pill rating and with a hand that is acceptable for certain end-uses, hand being rather subjective. To obtain a better hand, an LRV of about 10 or more may be used. Copolyesters of relative viscosity of somewhat lower LRV (lower than 9 LRV) can also be used with advantage as staple fiber, especially in blends with natural fibers, such as cotton and/or wool, as will be explained in more detail hereinafter.

According to another aspect of the invention, therefore, there is provided polyester staple fiber of denier per filament about 0.5 to about 5 and cut length about 20 mm to about 10 cm of such new basic-dyeable ethylene terephthalate copolyester copolymer, said fiber providing fabrics of acceptable hand and of pill rating as defined after 60 minutes of 2.5 to 5.

We have found, according to the invention, that such new copolyester copolymer compositions, when formed into staple fiber of non-round cross-section, especially of multi-grooved scalloped-oval cross-section, provide excellent cross-sectional shape retention, for instance an excellent multi-grooved configuration that can provide excellent comfort properties, such as moisture-management and dryness in fabrics, as well as excellent pilling performance and tactile aesthetics.

According to another aspect of the invention, therefore, there is provided such staple fiber of multi-grooved scalloped-oval peripheral cross-section of aspect ratio about 1.3:1 to about 3:1 and groove ratio as defined about 0.50:1 to about 0.95:1. Groove ratio is hereby defined as the ratio of the separation distance (such as $d_1$) between grooves on either side of the major axis of the cross-section to the width (such as $b_1$) of a bulge measured across the major axis, as described by Aneja in U.S. Pat. No. 5,626,961 (DP-6365-A) or by Roop in application Ser. No. 08/778,462 (DP-6550) filed Jan. 3, 1997.

Also provided, according to the invention, are downstream products of such fibers, including yarns, fabrics and garments and intermediate products, such as continuous filaments, tows and slivers, and processes for obtaining and for processing any of them. Preferred such processes are as follows, it being understood that the term "monomer" is used for convenience, as oligomer may be formed in a vessel before entering a polymerization vessel.

Accordingly, there is provided a continuous process for preparing such new basic-dyeable ethylene terephthalate copolyester polymer comprising (1) forming a monomer by a transesterification reaction between ethylene glycol and dimethyl terephthalate in a mole ratio of about 1.5–2.5:1 while introducing into the reaction a trifunctional or tetrafunctional silicate ortho ester and the sodium salt of dimethyl 5-sulfoisophthalate mixed in with at least some of said ethylene glycol, preferably at a temperature of about 100°–150° C., (2) passing the resulting monomer, preferably at a temperature of about 200°–236° C., via transfer piping while introducing therein a slurry of finely divided titanium dioxide in some of said ethylene glycol to a polymerization vessel, and (3) effecting polymerization of said monomer in a series of polymerization vessels while reducing the pressure to remove byproduct ethylene glycol and increasing the temperature, preferably increasing the temperature to about 260° to 290° C., and preferably reducing the pressure to about 1 to 5 mm Hg.

There is also provided a continuous process for preparing such new basic-dyeable ethylene terephthalate copolyester polymer comprising (1) forming a monomer by a transesterification reaction between ethylene glycol and dimethyl terephthalate in a mole ratio of about 1.5–2.5:1 while continuously introducing into the reaction the sodium salt of dimethyl 5-sulfoisophthalate mixed in with said ethylene glycol, preferably at a temperature of about 100°–150° C., (2) passing the resulting monomer, preferably at a temperature of about 200°–236° C., via transfer piping while introducing therein a slurry of finely divided titanium dioxide in additional ethylene glycol and the ethylene glycollate form of the silicate ortho ester mixed in with additional ethylene glycol to a polymerization vessel, and (3) effecting polymerization of said monomer in a series of polymerization vessels while reducing the pressure to remove byproduct ethylene glycol and increasing the temperature, preferably increasing the temperature to about 260° to 290° C., and preferably reducing the pressure to about 1 to 5 mm Hg.

There is further provided a continuous process for preparing such new basic-dyeable ethylene terephthalate copolyester polymer comprising (1) forming a monomer by an esterification reaction between ethylene glycol and terephthalic acid in a mole ratio of about 1.5–2.5:1, (2) passing the resulting monomer, preferably at a temperature of about 200°–236° C., while introducing therein ethylene glycollates of the sodium salt of 5-sulfoisophthalic acid and of a trifunctional or tetrafunctional silicate ortho ester in additional ethylene glycol and a slurry of finely divided titanium dioxide in additional ethylene glycol to a polymerization vessel, and (3) effecting polymerization of said monomer in a series of polymerization vessels while reducing the pressure to remove byproduct ethylene glycol and increasing the temperature, preferably increasing the temperature to about 260° to 290° C., and preferably reducing the pressure to about 1 to 5 mm Hg.

Preferably such new copolyester polymer is melt-spun into filaments at a withdrawal speed of about 1200 to 1800 ypm (1100–1650 m/min), and drawn preferably about 2X–3.5X, preferably at a temperature of about 80°–100° C., and crimped and relaxed, preferably at a temperature of about 100°–175° C., if desired being annealed at a temperature of about 150°–230° C. before relaxing. The resulting filaments (including staple fiber) are preferably of 0.5 to 5 dpf (about 0.5 to 6 dtex).

DETAILED DESCRIPTION OF PREFERRED EMBODIMENTS

Figure 1:
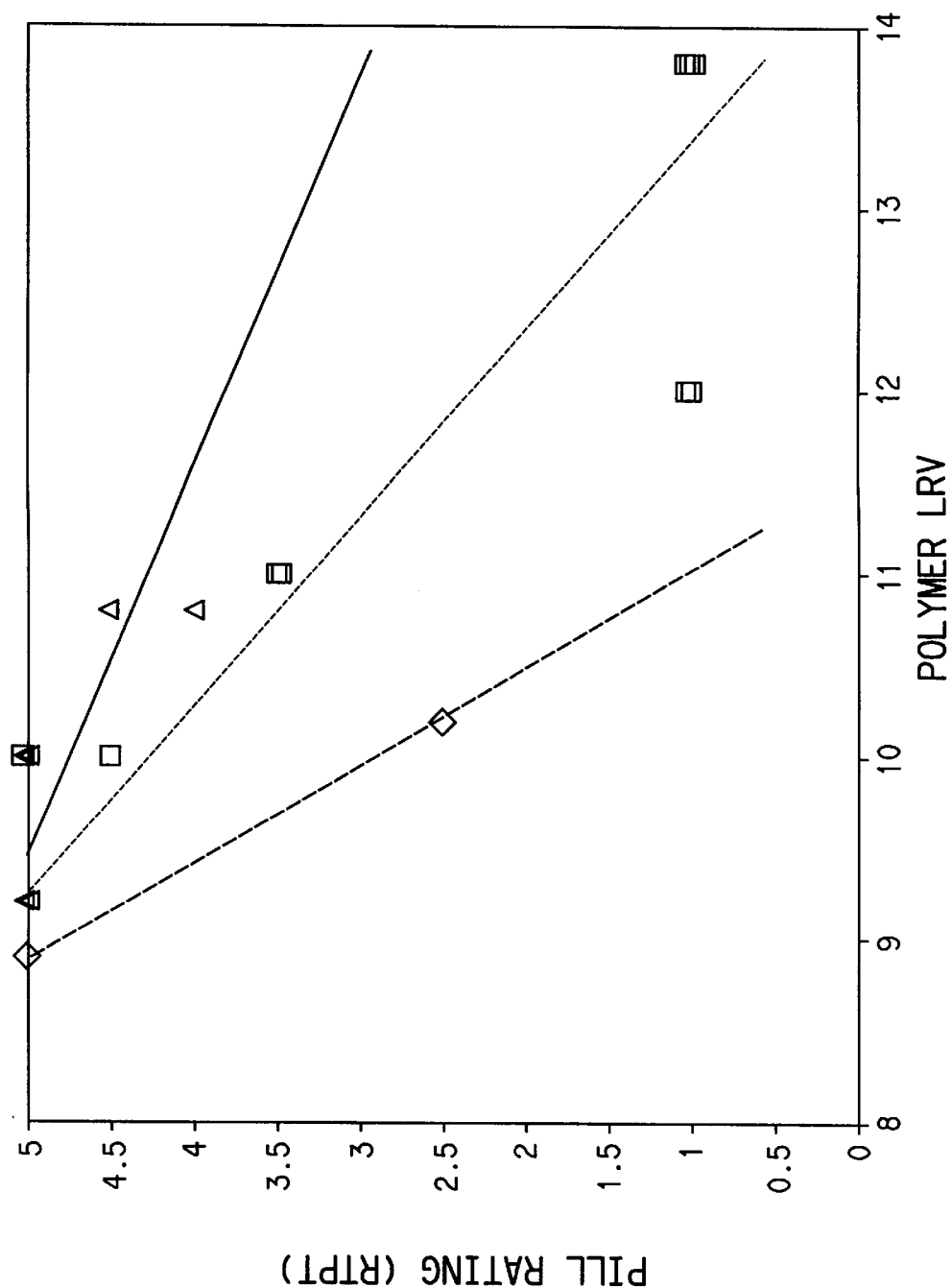
FIGS. 1 and 2 are schematic graphs as described hereinafter.

As indicated in the Background, the art contains much description relevant to the manufacture of polyester polymer compositions, their melt-spinning (extrusion) into filaments, processing of the filaments, including conversion to staple fiber, processing of staple fiber into spun yarn, processing of spun yarn into fabrics, and the treatment of fabrics, such as dyeing and finishing, and the testing of such fabrics and garments for their performance and of precursor filaments and staple, so it would be redundant to repeat such disclosure that is already available in the art; the disclosures in the art referred to herein, and in art cited therein are incorporated herein specifically by reference.

Useful staple fiber for conversion into spun yarn and for use in fabrics thereof is generally of dpf about 0.5 to 5 (0.5 to 6 dtex) and of cut length about 20 mm to about 10 cm. The new copolyester may, however, be used for other applications, which may require different shaped articles and/or other parameters.

A copolyester having ethylene terephthalate repeat units and containing also a sodium sulfonate salt of a glycollate of isophthalic acid has been used to improve dyeability for many years, as indicated in references such as we have mentioned herein above. Suitable amounts of such metal salt comonomer are generally 0.5 to 3 mol %, as disclosed in the art. The improved dyeability of the new polyesters according to the present invention is an important advantage, and overcomes one of the "complaints" about homopolyester PET fiber, but is not by itself a novel feature. Much of the disclosure hereinafter is directed to an ethylene terephthalate copolyester composition that has been found especially useful and advantageous, namely the sodium salt of dimethyl 5-sulfoisophthalate modified with tetraethyl orthosilicate, as these comonomers have been available and have given such excellent and surprising results according to the invention. However, variations may be used, as disclosed in the art.

Likewise, the use of oxysilicon compounds, such as tetraethyl orthosilicate, to improve pilling performance of polyester fibers was suggested generally and specifically in the prior art, such as mentioned hereinbefore, so is not by itself a novel feature.

No combination, however, of all claimed features of the present invention has been specifically taught, and, importantly, pilling has remained a serious problem for the polyester fiber industry despite the many suggestions published in the art.

The invention may be represented by a basic-dyeable ethylene terephthalate copolyester polymer that contains a sodium sulfonate salt of a glycollate of isophthalic acid, and that has been polymerized in the presence of a trifunctional or tetrafunctional silicate orthoester, characterized by being of relative viscosity about 8 to 12 LRV and about 1 to 3 ΔRV and containing titanium dioxide as a delusterant, such as can provide the combination of advantages we describe herein in fabrics of staple fibers of such polymer, namely excellent pilling performance, aesthetics and hand in fabrics. As for the ΔRV, we have preferred to use a ΔRV of at least about 1.5 ΔRV, and preferably about 2 to 3 ΔRV; we now believe that we can operate with a ΔRV of about 1 to 3 ΔRV.

Despite the abundance of prior literature, no one previously has disclosed how to provide knit fabrics of 100% polyester staple fiber from ethylene terephthalate polymers with a pill rating after 60 minutes as high as 4 or 5. The RTPT pilling test procedure is described hereinafter. Duncan may have disclosed the best such pill ratings of 2.0. As indicated, it is not clear how Jehl's pill ratings compare to ASTM D3512 82, but Jehl tested fabrics made from 50/50 blends of cotton with his (different) polyester fibers, and the presence of cotton would have increased his pill ratings over those obtainable from 100% polyester spun yarns. Jehl et al disclosed in U.S. Pat. Nos. 5,300,626 and 5,478,909 a process for obtaining continuously polyethylene terephthalate modified by —SiO— groups in a proportion of 300–700 ppm of Si during the direct esterification reaction between terephthalic acid and ethylene glycol, followed by polycondensation in a known manner by introducing methoxyethyl silicate or propyl silicate at a time when the prepolymer has a weight-average molecular mass of between 9,000 and 16,000, a polydispersity index of between 1.5 and 2, and when it is at a temperature of between 260° C. and 290° C., and at a pressure of between 1.5 and 2.5 bars, the silicate/prepolymer reaction time being at least 5 minutes. Jehl also claimed a "pilling-free" fiber capable of being employed in a mixture with at least one cotton fiber for weaving applications, based on polyethylene terephthalate modified with —SiO— groups bonded chemically to the macromolecular chains in an amount of 300 to 700 ppm of silicon and having: an elongation at break greater than zero and less than 25%; a tenacity greater than or equal to 40 cN/tex; a boiling water shrinkage of between 1.5 and 6%; and a flex abrasion index after dyeing greater than zero and less than or equal to 6,500 at 130° C., and under pressure; such modified polyethylene terephthalate having been obtained by such a process. Jehl's RTPT test is described in col 5, and is based on an AFNOR standard G 07-121, which is not understood nor used by us.

TEST PROCEDURES

The test procedures used by us are well-known and/or described in the art.

The dimensions and ratios for the fiber cross-sections were obtained using the following procedure. A fiber specimen is mounted in a Hardy microtome (Hardy, U.S. Department of Agriculture circa 378, 1933) and divided into thin sections according to methods essentially as disclosed in "Fiber Microscopy Its Technique and Applications" by J. L. Sloves (van Nostrand Co., Inc., New York 1958, No. 180–182). Thin sections are then mounted on a super FIBERQUANT video microscope system stage (Vashaw Scientific Co., 3597 Parkway Lane, Suite 100, Norcross, Ga. 30092) and displayed on the Super FIBERQUANT CRT under magnifications as needed. The image of an individual thin section of one fiber is selected and critical fiber dimensions measured. The ratios are then calculated. This process is repeated for each filament in the field of view to generate a statistically significant sample set, and the averages are given herein.

Relative Viscosity (LRV) is the viscosity of polymer dissolved in HFIP solvent (hexafluoroisopropanol containing 100 ppm of 98% reagent grade sulfuric acid). The viscosity measuring apparatus is a capillary viscometer obtainable from a number of commercial vendors (Design Scientific, Cannon, etc.). The relative viscosity in centistokes is measured on a 4.75 wt. % solution of polymer in HFIP at 25° C. as compared with the viscosity of pure HFIP at 25° C. The $H_2SO_4$ used for measuring LRV destroys cross-links, specifically silicon in the case of tetraethyl ortho silicate chain-brancher.

Non-Acid Relative Viscosity (NRV) is the viscosity of polymer similarly dissolved, measured and compared in hexafluoro-isopropanol solvent but without any sulfuric acid. Since the acid is not present, the cross-links are left intact when the NRV is measured.

Delta RV ($\Delta$RV) is the expression we have used herein to define the difference between the NRV and the LRV measured as described above, and express the amount of cross-linking destroyed by the acid when measuring LRV.

The pilling test procedure to measure a pill rating as defined herein is as follows. Staple fiber of cut length 1.5 inches (38 mm) is converted into yarn of 30/1 cc, which is knit on a 48-feed single jersey, 22-cut machine. The knit fabric is scoured for 10 minutes at 160° F. (71° C.) with an aqueous solution containing 30 grams of Merpol HCS and 30 gms of tetrasodium pyrophosphate, rinsed at room temperature for 5 minutes, dyed for 20 minutes at 220° F. (104° C.) at 15 psi (1 Kg/cm$^2$) in a 69 gallon (260 liter) Klauder, Weldon, Giles Model 25 PPW beck dye machine with 3% OWF Sevron Blue GBR 200%, 4% OWF carrier (Intercarrier 9P), 5% OWF sodium sulfate and 25 ml acetic acid, rinsed until clear, dried in a home laundry-type dryer (Kenmore) for 10 minutes at about 150° F. (65° C.), and pressed with a dry iron (heated to a permanent press setting). The resulting dyed and finished fabrics are evaluated for aesthetics, "hand" and cover and also for pilling following the standard procedure set out in the Random Tumble Pilling Tester Method ASTM D3512-82 for 60 minutes. These ratings are made on a scale of 1 to 5 by comparison with standard samples, 5 being the best, i.e., showing no pilling, whereas 1 is the worst, and the RTPT Pill Rating is an average of 10 tests, i.e., on 10 samples from the same fabric. Fiber of the invention exhibits excellent performance in such a pilling test and gives much higher pill ratings than polyester fiber commercially available hitherto. Fabrics of yarns made with blends of polyester and cotton may also be evaluated by the same RTPT method and generally give higher pill ratings than 100% polyester because of the presence of cotton, as already indicated. Woven fabrics may also be evaluated, and also generally give higher (better) pill ratings than fabrics knit from yarns of the same polyester staple fiber.

The invention is further illustrated in the following Examples; all parts, percentages and proportions are by weight unless indicated otherwise, polymer recipes being calculated with regard to the weight of the polymer. The yarn properties are measured in conventional units, denier being a metric unit, and so the tensile properties are given as measured in gpd, but conversions into SI units are also given in parentheses (g/dtex), and the Crimps per Inch, CPI, have similarly been converted, and are likewise shown in parenthesis (CPcm).

EXAMPLE 1

A copolyester of ethylene terephthalate copolymer was made with 1.94 mole % of sodium dimethyl 5-sulfoisophthalate and 0.17 weight % of tetraethyl orthosilicate, 0.3 weight % of titanium dioxide and having relative viscosities of 10 LRV and of 12.6 NRV, so 2.6 $\Delta$RV, as follows. Ethylene glycol (EG), containing transesterification and condensation catalysts and, in amounts by weight that are with respect to the weight of the EG added at this stage, 5.1 wt. % sodium dimethyl 5-sulfoisophthalate, 0.35 to 0.40 wt. % of tetraethyl orthosilicate, and approximately 76 ppm of tetraisopropyl titanate, was preheated to 149° C. and metered into a transesterification reactor above where dimethyl terephthalate (DMT) was also metered into the reactor at a temperature of 175° C. The molar ratio of EG:DMT metered into the reactor was about 2.25:1. Temperature was controlled by a Dowtherm-heated calandria at a temperature of about 236° C. at the base of the reactor. Low boiling materials (mainly methanol and water) were taken off overhead in vapor form and condensed, and part was recycled to the top of the reactor. Monomer product was removed at the base of the calandria and was pumped via a monomer transferline to the first of three polymerization vessels. A slurry containing titanium dioxide and a recipe of whitening agents in additional EG was injected into the monomer transferline prior to entering the first vessel of these polymerization vessels. Phosphoric acid in additional EG was metered into this first vessel to deactivate the transesterification catalyst. The pressure in the first (pre) polymerization vessel was controlled at 100 mm Hg, and the temperature of the resulting prepolymer was controlled at 232° C. Prepolymer was transferred to the second polymerization vessel. Pressure in this second polymerization vessel (called a PP) was controlled at 35 mm Hg. Prepolymer of higher LRV was removed from this vessel at a temperature of 261° C., and was transferred to the final polymerization (finisher) vessel. Pressure in this third vessel was controlled to give the goal LRV and NRV (10 and 12.6, respectively) and was usually in the range of 1.5 to 4 mm Hg. The temperature of polymer leaving this third vessel was controlled at 269° C.

Figure 2:
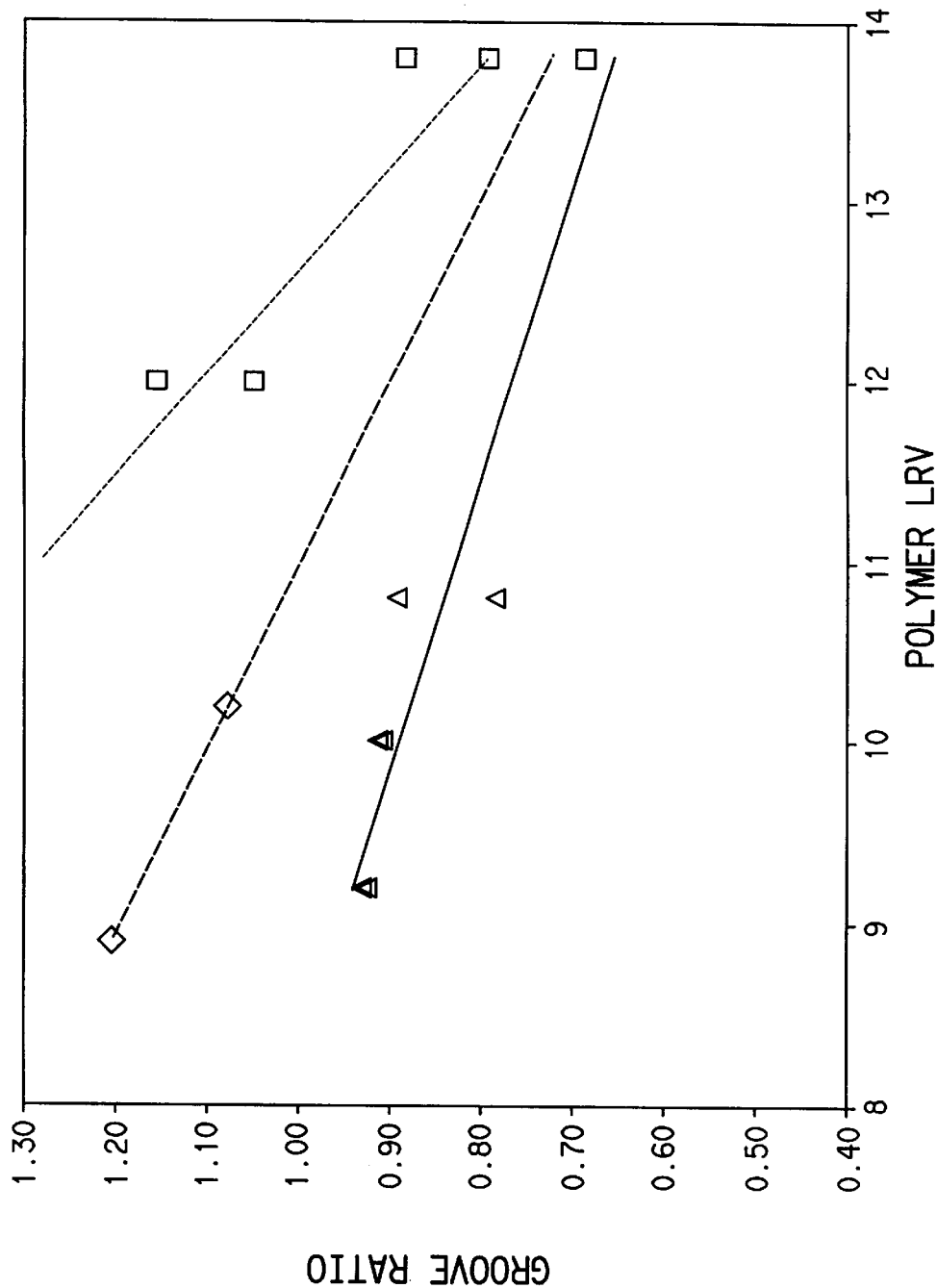

Filaments of approximately 3 dpf (3.3 dtex) were melt-spun at 274° C. from this copolyester by being extruded through 1,506 capillaries at a rate of 92.4 lbs (41.9 Kg) per hour per position on 14 positions of a conventional spinning machine. The capillary orifice shape was three diamonds joined together as described in application Ser. No. 08/662, 804 (DP-6400) filed Jun. 12, 1996 by Aneja and as shown in FIG. 2 thereof so as to make filaments of 4-grooved scalloped-oval cross-section similar to that described therein.

The filaments were spun at a withdrawal speed of 1500 ypm (about 1370 m/min), quenched as described by Anderson et al in U.S. Pat. No. 5,219,582, and collected in a can as a tow bundle of approximately 63,252 denier (about 70,280 dtex). The as-spun properties are given in Table 1.

26 cans of this tow were combined to give a tow of 548,184 filaments and 1.65 million denier (1.83 million dtex) and drawn at a draw ratio of 2.55X in hot spray water at a temperature of 85° C., then passed through a stuffer box crimper, after which some of the tow was relaxed at a temperature of 100° C. ($1_{100}$) and some was relaxed at a temperature of 123° C. ($1_{123}$) to give final tows of denier 767,458 (852,731 dtex), i.e., of filaments of about 1.4 dpf (1.6 dtex). The drawn properties are in Table 1.

The tows were cut to staple of length 1.5 inches (38 mm) after applying a conventional finish to give a level of about 0.2% finish on fiber, and the staple was converted to yarn (30/1 cc) and knit as described on a 48-feed single jersey, 22-cut machine to a knit fabric that was dyed and finished so its pilling and other fabric characteristics could be evaluated as described. Both fabrics had a pill rating of 5, which was not only excellent but an astonishing rating for a 100% polyester knit fabric, especially as the fabric also showed excellent aesthetics, hand (tactility) body and cover.

TABLE 1

| FILAMENTS | TENACITY gpd (g/dtex) | $E_B$ % | MODULUS gpd (g/dtex) | DHS % | CPI (CPcm) | GROOVE RATIO | ASPECT RATIO |
|---|---|---|---|---|---|---|---|
| As-spun | 1.1 (1.0) | 199 | 17 (15) | | | | |
| Drawn $1_{100}$ | 2.3 (2.5) | 23 | 32 (29) | 3.0 | 18 (7) | 0.91:1 | 1.7:1 |
| Drawn $1_{123}$ | 2.2 (2.4) | 19 | 33 (30) | 2.8 | 15 (6) | 0.91:1 | 1.7:1 |

EXAMPLE 2

Copolyester similar to that described in Example 1 was prepared except that the amount of tetraethyl silicate in the polymer was 0.12% by weight (the EG containing 0.25 to 0.30% by weight), and the viscosities of the resulting polymer were 10.8 LRV and 13.5 NRV, and so 2.5 ΔRV, and filaments of similar dpf and cross-section were spun and processed therefrom. The spun filaments were drawn and relaxed as described in Example 1, and the properties of the spun and of both sets of drawn filaments are in Table 2. The drawn filaments were processed as described in Example 1, and the fabrics were also evaluated as described. These fabrics had excellent aesthetics as did those of Example 1, and their pilling performance was also far superior to prior polyester fabrics, but slightly worse than that of Example 1, $2_{100}$'s pill rating being 4.5, and $2_{123}$'s being 4.

TABLE 2

| FILAMENTS | TENACITY gpd (g/dtex) | $E_B$ % | MODULUS gpd (g/dtex) | DHS % | CPI (CPcm) | GROOVE RATIO | ASPECT RATIO |
|---|---|---|---|---|---|---|---|
| AS-spun | 1.0 (0.9) | 232 | 17 (15) | | | | |
| Drawn $2_{100}$ | 2.5 (2.2) | 30 | 37 (34) | 5.1 | 15 (6) | 0.78:1 | 1.7:1 |
| Drawn $2_{123}$ | 2.8 (2.5) | 23 | 40 (36) | 1.3 | 17 (7) | 0.89:1 | 1.7:1 |

Fiber (1.4 dpf) from Example 2 was blended 50/50 with combed cotton and this 50/50 blend was ring-spun into 30/1 CC yarn, which was knit into fabric on a 48-feed single jersey 22-cut machine, which was dyed, and subjected to the same RTPT test as described for 100% polyester yarns of the invention.

For comparison purposes, a commercial 1.5 denier per filament (1.7 dtex) T-107W (round 11.5 LRV homopolymer) staple fiber was chosen because it is commercially available from DuPont as a "pill resistant" product for knit end uses. This comparison fiber was likewise blended 50/50 with combed cotton, ring-spun to 30/1 CC yarn, knit on the same knitting machine into a 22-cut jersey, dyed, and subjected to the same RTPT test.

RTPT results after the indicated test times for the fabrics of yarn of the invention and of the T-107W yarns are in Table 2A and clearly show significant pilling advantage despite somewhat similar LRVs.

TABLE 2A

(50/50 COTTON BLEND YARNS)

| TEST TIME | EXAMPLE 2 | T-107W |
|---|---|---|
| 30 minutes | 4.0 | 1.8 |
| 60 minutes | 4.5 | 1.2 |

It is also significant to see that the pilling exhibited by the prior art "pill-resistant" product continued as shown by the fact that the pill rating after 60 minutes (1.2) was lower than after 30 minutes (1.8), whereas, in contrast, the pill rating of the fabric of the invention improved to 4.5 after 60 minutes from 4.0 after 30 minutes. The contrast is most important commercially, as customers want the appearance of their fabrics and garments to remain aesthetically pleasing for as long as possible.

EXAMPLE 3

The copolyester was similar to that used for Example 1 except that the amount of tetraethyl silicate in the polymer was 0.29% by weight (the EG containing 0.5 to 0.55% by weight), and the viscosities of the resulting polymer were 9.2 LRV and 12.3 NRV, and so 2.9 ΔRV, and filaments of similar dpf and cross-section were spun and processed therefrom. This copolyester and filaments therefrom are according to the invention. A fabric of 100% polyester fiber made thereof had excellent pilling performance and less desirable hand (for certain end-uses) and is discussed hereinafter as Fabric A.

We believe that fabrics of acceptable hand (this being rather subjective) can be obtained from these fibers and from fibers of like relative viscosity, especially in blends with natural fibers, such as cotton and/or wool, wherein the natural fibers will provide better hand, and that the excellent pilling performance of those polyester fibers of such low viscosity copolyester composition can be used advantageously, even in 100% polyester fabrics.

COMPARISON 100% POLYESTER FABRIC DATA

The following data for comparison 100% polyester Fabrics B to G demonstrate the inferiority of such 100% polyester fabrics made from fibers of alternative copolyester polymer compositions, in other words demonstrate the superiority of the copolyester polymers of Examples 1 and 2. The properties of the filaments used in these fabrics are given in Table 3. All of them were made and processed into fabrics essentially as described for the fibers of Examples 1 and 2 except as indicated.

Table 3 also contains, for convenience, data for Fabric A which was made from the copolyester fiber of Example 3. This fabric gave excellent pill ratings of 5 and acceptable fiber shape definition, with less desirable hand for certain end-uses. In other words, one can obtain excellent pilling performance by using a copolyester according to the invention and dropping the relative viscosity into the preferred low LRV range of about 9–11; if the relative viscosity is dropped too much, then the hand of fabrics of 100% of such polyester fiber becomes less desirable for certain end-uses. This is not to say that a polymer of very low LRV below 9 cannot be processed into fibers and fabrics (including when blended with cotton or wool) having a combination of excellent pilling performance, aesthetics and hand characteristic of those of Example 1, but as the relative viscosity of the polymer is decreased, so the danger of making fabrics of less desirable hand will increase. We did believe that an optimum combination could be obtained by using polymer of LRV about 10, with a ΔRV of about 2.5, but further experimentation has shown that, depending on different end-uses, there may be a more precise optimum that could be somewhat different from 10 and that could vary according to end-use.

Comparison B compared fabrics made from commercially-available fibers, sold by DuPont as Type 702W. The filaments were spun essentially as described in Example 1, except as follows. The copolyester was made with 2 mole % of sodium dimethyl 5-sulfoisophthalate and had an LRV of 13.8. No tetraethyl silicate was used in Comparison B. The amount of tetraisopropyl titanate in the EG was about 114 ppm, the molar ratio of EG:DMT was 1.94:1, the temperatures of the polymer leaving the three polymerization vessels were, respectively, first 243° C., second (PP) 276° C. and third (finisher) 283° C., and the pressure in the second (PP) vessel was controlled at 25 mm Hg. The polymer was extruded through 1,054 capillaries at a rate of 64.7 lbs (29.4 Kg) per hour per position on 16 positions of a commercial spinning machine. The resulting tow of 16,864 filaments, was of 50,592 denier (56,200 dtex). 33 cans of such tow were combined to a total of 556,512 filaments, 1.7 million denier (1.9 million dtex). After drawing, the drawn filaments were relaxed at 123° C. to give a final denier of about 800,000 (900,000 dtex) and average dpf 1.4 (as for Example 1). The cut fibers were formed into yarns of 30/1 cc. The pill rating was only 1, but the fabric had good hand and cover, demonstrating the need for a fiber with comparable aesthetics but improved pilling performance.

Comparisons C, D and E were spun from copolyester made essentially as described for Comparison B, but of lower viscosity, C having 12 LRV, D having 11 LRV, and E having 10 LRV. The molar ratio of EG:DMT was 2.22:1 and tetraisopropyl titanate input was 76 ppm in the EG. None of these fibers (in contrast to the commercial fibers of Comparison B) retained the desirable scalloped-oval cross-section that the orifice is designed to provide, even the fibers of Comparison C (12 LRV) having groove ratios of more than 1, with the others being even worse, those of Comparisons $D_{123}$ and E being virtually round. The fabric aesthetics also suffered. Fabrics of Comparison E showed good pilling performance, $E_{123}$ having an excellent pill rating of 5, $E_{100}$ having a pill rating of 4.5, and both $D_{100}$ and $D_{123}$ having good pill ratings of 3.5, whereas $C_{100}$ and $C_{123}$ had pill ratings of 1. These results show what happens and why it is not satisfactory merely to lower the relative viscosity of the polymer used to make the commercial fibers of Comparison B.

Comparison F is very similar to Comparison C, but these filaments (spun from polymer of 12 LRV) had 6-grooved scalloped-oval cross-section, having been spun as described by Aneja in U.S. Pat. No. 5,626,961. The pill rating was similarly only 1.

Comparisons G were made from polymers of ethylene terephthalate (without any sulfoisophthalate glycollate salt) containing different levels of tetraethyl silicate (TES), Ga being made with 0.24% TES and having 10.2 LRV and 15.3 NRV, so 5.1 ΔRV, and Gb being made with 0.27% TES and having 8.9 LRV and 15.4 NRV, and so 6.5 ΔRV. The procedures were essentially similar to that in Example 1, exceptions being that no dimethyl sulfoisophthalate salt was added, the proportions of the materials added in the EG were, for tetraethyl orthosilicate, by weight, about 0.86%

(Ga) and 0.94% (Gb), and for tetraisopropyl titanate about 32 ppm, the molar ratio of EG:DMT was about 1.88:1, the temperature of the calandria was about 237° C. for Ga (236° C. for Gb), the pressure was 130 mm Hg for both first (pre)polymerization vessels so the temperature of the resulting prepolymers was controlled for both at 240° C., the pressures for the second (PP) vessels were both 35 mm Hg so the temperatures of the prepolymers at higher LRV were 273° C. (Ga) and 271° C. (Gb), and the temperatures of the polymers leaving the finishers were 281° C. (Ga) and 280° C. (Gb). The as-spun filaments were of 4.3 dpf (4.8 dtex), and were spun at 282° C. (Ga) and 281° C. (Gb) at a rate of 96.4 lbs (43.8 Kg) per hour per position on 38 positions to give a tow of approximately 161,799 denier (179,777 dtex). 13 cans were combined to give a combined denier of about 2.1 million (2.3 million dtex) and drawn at a draw ratio of 2.92X in hot sprayed water at a temperature of 88° C., crimped and relaxed at 140° C. to give a final tow denier of 850,000 (940,000 dtex), average 1.5 dpf (1.7 dtex). Comparison Gb (LRV 8.9) had an excellent pill rating of 5, but unacceptable aesthetics, while Comparison Ga (LRV 10.2) had a poor pill performance (pill rating of 2) and better aesthetics, except that neither Ga nor Gb retained the desirable scalloped-oval cross-section with deep grooves.

The numerics in Table 3 need little or no explanation beyond what is described in the art already referred to. A groove ratio of 1.0:1 indicates that there is no real groove in a filament spun from a capillary orifice shape as described and designed for spinning filaments of scalloped-oval cross-section with grooves; although there are no real grooves in the sense that $d_1$ is less than $b_1$, as described by Aneja in U.S. Pat. No. 5,626,961, for example, a groove ratio of 1.0:1 indicates a discontinuity in the periphery of the filament; so some of the numerics indicate "groove ratios" of more than 1.0:1. Where "NONE" is recorded, there is no such discontinuity, i.e., the drawn $D_{100}$ filaments were of smooth oval peripheral cross-section, and the drawn $D_{123}$ and E filaments were of essentially round peripheral cross-section.

FIG. 1 has lines plotted to show schematically the influence of polymer LRV (on x-axis) on the pill rating (on y-axis). The pill rating always improved as the LRV was lowered, bearing in mind, however, as demonstrated hereinbefore that, depending on the polymer composition, if the LRV is too low, then the fabric hand and fiber shape definition may be impaired even though the pilling performance may have been improved. The schematic plots are shown with 2 diamond-shaped data points and a line of long dashes therethrough for polymer containing only TES, as disclosed in Comparisons G, with 5 squares representing 7 data points (the plots for two pairs of data points coinciding, so being the same squares) and generating a plotted line that is shown as a dotted line for polymer containing only sulfoisophthalate glycollate salt, as disclosed in Comparisons B–E, and with 4 triangles representing 6 data points (the plots at 9.2 LRV coinciding, and the plots at 10 LRV coinciding, not only with each other, but with the square for $E_{123}$) and generating a plotted line that is shown as a continuous line for polymer containing both TES and the sulfoisophthalate glycollate salt according to Examples 1–3. As can be seen, the slope of the continuous line is not so steep as for the other lines so, not only is the pilling performance better, but more of the continuous line is in the zone showing better pill ratings, i.e., the pill rating is better over a greater range of relative viscosities, a pill rating of 5 being the maximum possible according to this RTPT test. Leaving aside problems of fabric handle that may be encountered with some fibers of low LRV, it was surprising to discover that the pilling performance improved when the polymer contained both TES and the sulfoisophthalate glycollate over the pilling performances obtained when using either polymer that did not contain both such comonomers.

FIG. 2 has lines similarly plotted to show schematically the influence of polymer LRV (on x-axis) on the groove ratio (on the y-axis) for fibers, the filaments having been spun with a 4-grooved scalloped-oval cross-section under similar conditions, except for using different polymer LRVs. The

TABLE 3

Properties of Filaments Used

| FILAMENTS | TENACITY gpd | $E_B$ % | MODULUS gpd | DHS % | CPI (CPcm) | GROOVE RATIO | ASPECT RATIO |
|---|---|---|---|---|---|---|---|
| A as-spun | 0.8 (0.7) | 275 | 18 (16) | | | | |
| $A_{100}$ drawn | 1.8 (1.6) | 22 | 34 (31) | 3.3 | 16 (6) | 0.93:1 | 1.7:1 |
| $A_{123}$ drawn | 1.8 (1.6) | 19 | 31 (28) | 1.7 | 18 (7) | 0.93:1 | 1.8:1 |
| B as spun | 1.3 (1.2) | 239 | 18 (16) | | | | |
| $B_{123}$ drawn | 3.4 (3.1) | 37 | 34 (31) | 4.1 | 12 (5) | 0.68:1 | 1.7:1 |
| C as-spun | 1.1 (1.0) | 220 | 16 (14) | | | | |
| $C_{100}$ drawn | 2.5 (2.3) | 30 | 24 | 5.8 | | 1.16:1 | 1.4:1 |
| $C_{123}$ drawn | 2.8 (2.5) | 33 | 31 | 3.0 | | 1.05:1 | 1.4:1 |
| D as-spun | 1.0 (0.9) | 241 | 17 (15) | | | | |
| $D_{100}$ drawn | 2.5 (2.3) | 47 | 27 (24) | 7.7 | | None | 1.4:1 |
| $D_{123}$ drawn | 2.3 (2.1) | 30 | 24 (22) | 1.8 | | None | 1.02:1 |
| E as spun | 0.9 (0.8) | 261 | 17 (15) | | | | |
| $E_{100}$ drawn | 2.4 (2.2) | 26 | 24 (22) | 7.5 | | None | 1 |
| $E_{123}$ drawn | 2.2 (2.0) | 21 | 21 (19) | 2.8 | | None | 1 |
| F as-spun | 1.5 (1.4) | 169 | 24 (22 | | | | |
| $F_{123}$ drawn | 3.6 (3.2) | 18 | 41 (37) | 5.0 | 8.3 (3) | | |
| Ga as-spun | 0.8 (0.7) | 294 | 7 (6) | | | | |
| $Ga_{140}$ drawn | 2.7 (2.4) | 32 | 40 (36) | 1.5 | 8 (3) | 1.08:1 | 1.5:1 |
| Gb as-spun | 0.8 (0.7) | 335 | 7 (6) | | | | |
| $Gb_{140}$ drawn | 2.2 (2.0) | 12 | 42 (38) | 0.9 | 11 (4) | 1.20:1 | 1.5:1 |

The information presented schematically in FIGS. 1 and 2 may be of help in understanding the surprising nature of the advances that have been obtained.

groove ratio gives a good numerical indication of how the fiber cross-section definition is maintained. As can be seen, the groove ratio always increases as the polymer LRV is lowered which means that lowering the polymer LRV (which, as we have seen, tends to improve pilling performance) provides such fibers (intended to be of non-round cross-section) with inferior fiber shape definition. We have no numerical quantification of fabric handle, but fabric handle also suffers as polymer LRV is lowered. So, in order to get fabrics of good aesthetics having fibers of good shape retention (shape definition) and fabrics produced therefrom to exhibit good pilling performance, one has had to balance these considerations and has had to accept a compromise, when using polymers containing only TES without sulfonate salt comonomer, or only sulfonate salt comonomer without TES, whereby neither pilling performance was optimum (because shape retention and handle would be unacceptable), nor was shape retention and fabric hand optimum unless pilling resistance was to be sacrificed to obtain optimum hand and fiber shape for such non-round shapes. Turning to the differences between the plots for the various polymer compositions in FIG. 2, it will be seen that the slope is very pronounced for the dotted line plotted for copolyesters containing only 2% sulfoisophthalate glycollate salt, without any TES; the groove ratio increased above 1.0 by an LRV of about 13, indicating that these fibers did not have any grooves, and that such an LRV was not satisfactory for this copolyester. The slope of the line of long dashes is not so steep for the polymer containing only TES, without any sulfoisophthalate glycollate salt, indicating better shape retention, but a polymer having an LRV of about 11 provided a groove ratio of about 1.0 that was not satisfactory. Surprisingly, however, when the polymer was made with both TES and the salt of the sulfoisophthalate glycollate as shown by the continuous line, the groove ratios were better than for either of the other polymers, and the slope was even less steep. This may explain why, in hindsight, according to the invention, by using both TES and the sulfoisophthalate glycollate salt in the copolyesters according to the invention, it is possible to operate within a narrow band of LRVs and obtain the long-desired objective of excellent pilling performance and good fiber shape retention and fabric handle in the resulting knit fabrics of 100% polyester. As indicated hereinabove, by using a copolyester according to the invention with a relative viscosity slightly different from the optimum, advantages can be found, especially when using such polyester staple fibers blended with natural fibers, for example cotton, or wool. When the LRV was low (9.2), the pilling performance was found to be excellent, and the hand (unacceptable in the 100% polyester knit fabrics we tested and described herein) could be improved by blending with cotton, for example, as has been explained. For higher viscosity copolyester, e.g., an LRV of about 12, the pilling performance may not be acceptable in 100% polyester knit fabrics, but may be acceptable in woven fabrics of 100% polyester and can be improved by blending the polyester fiber with cotton or wool.

What is claimed is:

1. A basic-dyeable ethylene terephthalate copolyester polymer that contains 0.5 to 3 mol % of a sodium sulfonate salt of a glycollate of isophthalic acid, and that has been polymerized in the presence of a trifunctional or tetrafunctional silicate ortho ester in amount 0.05 to 0.5% by weight, and that contains titanium dioxide in amount 0.1 to 2% by weight, said copolyester being of relative viscosity about 8 to 12 LRV and about 1 to 3 delta RV, as defined.

2. The polymer of claim 1 that is of relative viscosity about 9 to 11 LRV and about 2 to 3 delta RV, as defined.

3. The polymer of claim 1 in the form of staple fiber of denier per filament about 0.5 to about 5 and cut length about 20 mm to about 10 cm, said fiber providing fabrics of acceptable hand and of pill rating as defined after 60 minutes of 2.5 to 5.

4. The polymer of claim 3, wherein said fiber is of multi-grooved scalloped-oval peripheral cross-section of aspect ratio about 1.3:1 to about 3:1 and groove ratio as defined about 0.50:1 to about 0.95:1.

* * * * *